United States Patent
Li et al.

(10) Patent No.: US 8,438,248 B2
(45) Date of Patent: May 7, 2013

(54) OPTIMIZATION OF NETWORK PROTOCOL OPTIONS BY REINFORCEMENT LEARNING AND PROPAGATION

(75) Inventors: Cong Li, Shanghai (CN); Wenbin Xu, Shanghai (CN)

(73) Assignee: Intel Corporation, Santa Clara, CA (US)

(*) Notice: Subject to any disclaimer, the term of this patent is extended or adjusted under 35 U.S.C. 154(b) by 1770 days.

(21) Appl. No.: 10/591,378

(22) PCT Filed: Mar. 29, 2006

(86) PCT No.: PCT/CN2006/000545
§ 371 (c)(1),
(2), (4) Date: Aug. 31, 2006

(87) PCT Pub. No.: WO2007/109923
PCT Pub. Date: Oct. 4, 2007

(65) Prior Publication Data
US 2009/0187641 A1   Jul. 23, 2009

(51) Int. Cl.
*G06F 15/16* (2006.01)
*G06F 15/173* (2006.01)

(52) U.S. Cl.
USPC ............ 709/220; 709/227; 709/224; 709/203

(58) Field of Classification Search .......... 709/223–227, 709/203; 706/15–17
See application file for complete search history.

(56) References Cited

U.S. PATENT DOCUMENTS

| | | | |
|---|---|---|---|
| 7,013,238 B1* | 3/2006 | Weare | 702/182 |
| 7,478,160 B2* | 1/2009 | Jennings, III | 709/227 |
| 2002/0058532 A1* | 5/2002 | Snelgrove et al. | 455/557 |
| 2003/0074338 A1* | 4/2003 | Young et al. | 706/15 |
| 2003/0204615 A1* | 10/2003 | Wei et al. | 709/232 |
| 2004/0120011 A1 | 6/2004 | Double | |
| 2004/0133599 A1* | 7/2004 | Warren et al. | 707/104.1 |

(Continued)

FOREIGN PATENT DOCUMENTS

| | | |
|---|---|---|
| CN | 1402494 | 3/2003 |
| CN | 1659800 | 8/2005 |
| JP | 2001-268093 | 9/2001 |

OTHER PUBLICATIONS

Prem Kumar, G. et al. Network Performance Tuning Using Reinforcement Learning, In: IEEE Global Telecommunications Conference, 1998. GLOBECOM 98. The Bridge to Global Integration, Nov. 8-12, Sydney, vol. 2, 1123-1128.

"Summary of Notice of Reasons for Rejection", Ryuka,Japanese Application No. 2008-552663, Date of Delivery Feb. 8, 2011, 2 pages.

(Continued)

*Primary Examiner* — Ian N Moore
*Assistant Examiner* — Thai Nguyen
(74) *Attorney, Agent, or Firm* — Blakely, Sokoloff, Taylor & Zafman LLP (57) ABSTRACT

In one embodiment, a method for optimization of network protocol options with reinforcement learning and propagation is disclosed. The method comprises: interacting, by a learning component of a server of a network, with one or more clients and an environment of the network; conducting, by the learning component, different trials of one or more options in different states for network communication via a protocol of the network; receiving, by the learning component, performance feedback for the different trials as rewards; and utilizing, by the learning component, the different trials and associated resulting rewards to improve a decision-making policy associated with the server for negotiation of the one or more options. Other embodiments are also described.

19 Claims, 5 Drawing Sheets

U.S. PATENT DOCUMENTS

| | | | |
|---|---|---|---|
| 2004/0141525 A1* | 7/2004 | Bhushan et al. | 370/473 |
| 2005/0030903 A1* | 2/2005 | Al-Zain et al. | 370/252 |
| 2005/0193136 A1* | 9/2005 | Burckart et al. | 709/230 |
| 2005/0251516 A1* | 11/2005 | Stakutis et al. | 707/10 |
| 2006/0171356 A1* | 8/2006 | Gurelli et al. | 370/329 |
| 2006/0274899 A1* | 12/2006 | Zhu et al. | 380/281 |
| 2007/0058669 A1* | 3/2007 | Hoffmann et al. | 370/466 |
| 2007/0299915 A1* | 12/2007 | Shraim et al. | 709/206 |

OTHER PUBLICATIONS

Gima, Satoshi, et al., "Selective Streaming System Based on Network State", *Proceedings of the 28th symposium in Information Theory and Its Applications (SITA2005) vol. II of II.*, pp. 625-628.

"PCT International Search Report and the Written Opinion of the International Searching Authority", PCT/CN2006/000545 Mailed Jan. 25, 2007, (Dec. 23, 2006), 12 Pgs.

* cited by examiner

OPTIMIZATION OF NETWORK PROTOCOL OPTIONS BY REINFORCEMENT LEARNING AND PROPAGATION

CROSS-REFERENCE TO RELATED APPLICATION

This application is a National Phase application of, and claims priority to, International Application No. PCT/CN2006/000545, filed 29 Mar. 2006, entitled OPTIMIZATION OF NETWORK PROTOCOL OPTIONS BY REINFORCEMENT LEARNING AND PROPAGATION.

FIELD OF THE INVENTION

The embodiments of the invention relate generally to the field of network communication and, more specifically, relate to optimization of network protocol options by reinforcement learning and propagation.

BACKGROUND

Trivial file transfer protocol (TFTP) is a simple user datagram protocol (UDP)-based file transfer program that is frequently used in pre-boot environments. For example, TFTP is widely used in image provisioning to allow diskless hosts to boot over the network.

TFTP provides extensive options, such as block size of data packets and multicast provisioning, which may be applied in order to achieve better performance. For instance, a larger value block size may result in better transfer performance (e.g., a session with the block size of 32 KB results in a 700% increased performance gain over a session with the block size of 512 B in certain 100 Mbps environments). Multicasting enables simultaneous provisioning to multiple clients.

When a TFTP server receives requests from clients, simple negotiations are conducted in which the TFTP server may select appropriate option values as responses. After the negotiation, TFTP sessions are created and the files are transferred according to the selected options of the sessions. However, TFTP option selection presents problems in the area of optimizing and propagation of these options in different network environments for performance enhancement. The effectiveness of the TFTP options is highly dependent on the specific network environments. Some affecting factors on performance include, but are not limited to: network topology, switches and their configurations, network drivers, and implementation of the TFTP clients.

In some cases, TFTP options that could lead to high performance in some environments may be risky in other environments, possibly even causing failures. One example is that a single session of a block size of 32 KB may fail on one type of switch, while a block size of 16 KB may succeed on the same switch with acceptable performance. Another example is that a single multicast session of a block size of 32 KB on an older driver version of a certain Ethernet adapter in a 1 Gbps environment may fail, while reducing the block size or replacing an updated version of the driver will succeed. These issues become more serious when the environments are complicated.

For instance, complicated environments may include infrastructures having connectors with hubs, a mix of both 1 Gbps connections and 100 Mbps connections, implementations of UDP multicast of different switches, multiple sessions occurring simultaneously but starting and ending at different times, specific TFTP clients not perfectly implemented due to pre-boot limitations, etc. There are no obvious rules or guidelines that uniformly work in these different environments. Therefore, under current TFTP implementations, it is difficult for a TFTP server to make optimal decisions during option negotiation that can both achieve a high performance and ensure success of a file transfer.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

An apparatus and method for optimization of network protocol options by reinforcement learning and propagation are disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the present invention describe a method and respective circuit for optimization of network protocol options by reinforcement learning and propagation. More specifically, embodiments of the invention provide a novel approach to trivial file transfer protocol (TFTP) option negotiation and selection using reinforcement learning and propagation.

Figure 1:
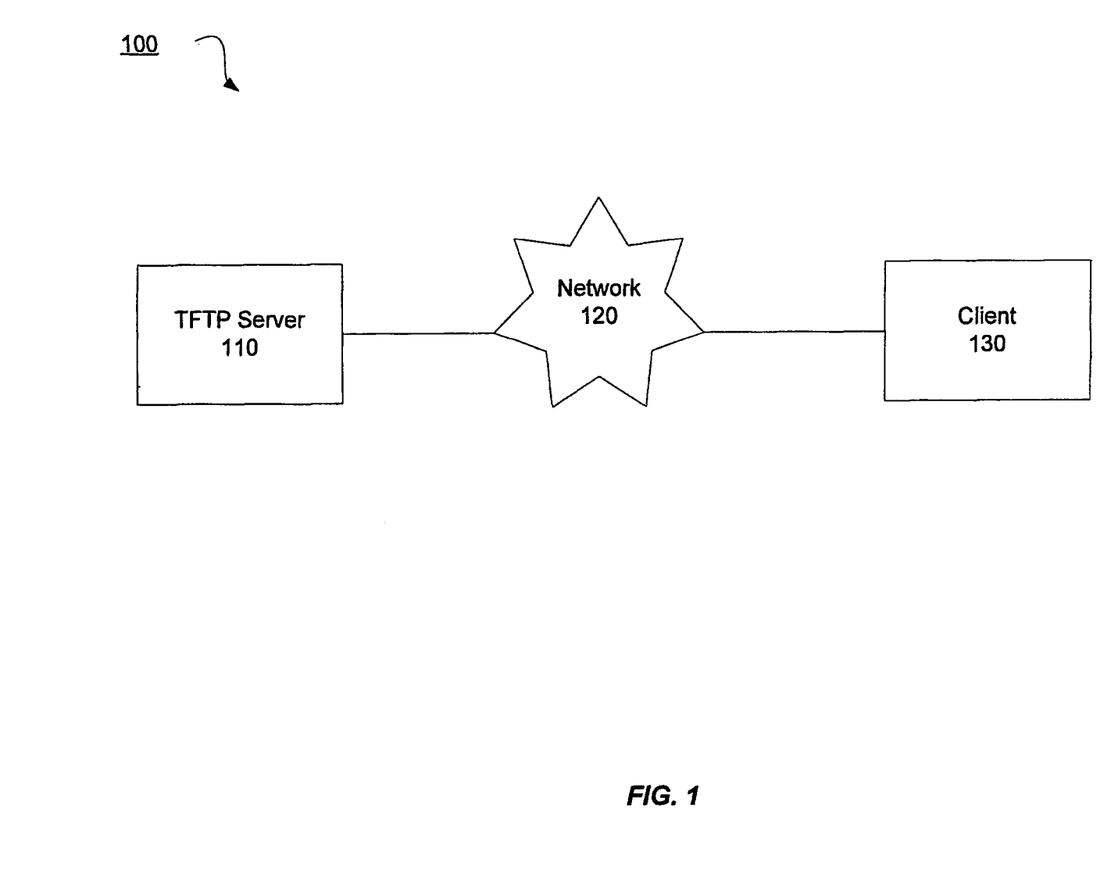
FIG. 1 is a block diagram of one embodiment of an exemplary network system to perform embodiments of the invention.

FIG. 1 is a block diagram illustrating one embodiment of an exemplary network system to perform embodiments of the invention. System 100 includes a TFTP server 110, a network 120, and a client 130. TFTP server 110 may listen over network 120 for connection requests from client 130. Client 130 may make a connection to the TFTP server 110. Once connected, client 130 and TFTP sever 1100 may communicate via the TFTP. For instance, client 130 may do a number of file manipulation operations such as uploading files to the TFTP server 110, download files to the TFTP server 110, and so on. In other embodiments, one skilled in the art will appreciate that a server other than a TFTP server communicating via the TFTP (e.g., FTP server) may be utilized.

Additionally, TFTP server 110 and client 130 may further enter into option negotiations. During option negotiations, options to enhance and modify the functionality of the TFTP may be selected and enacted between the TFTP server 110 and client 130. Embodiments of the invention provide a novel approach for the optimum selection of protocol options during option negotiation by using reinforcement learning and propagation.

Figure 2:
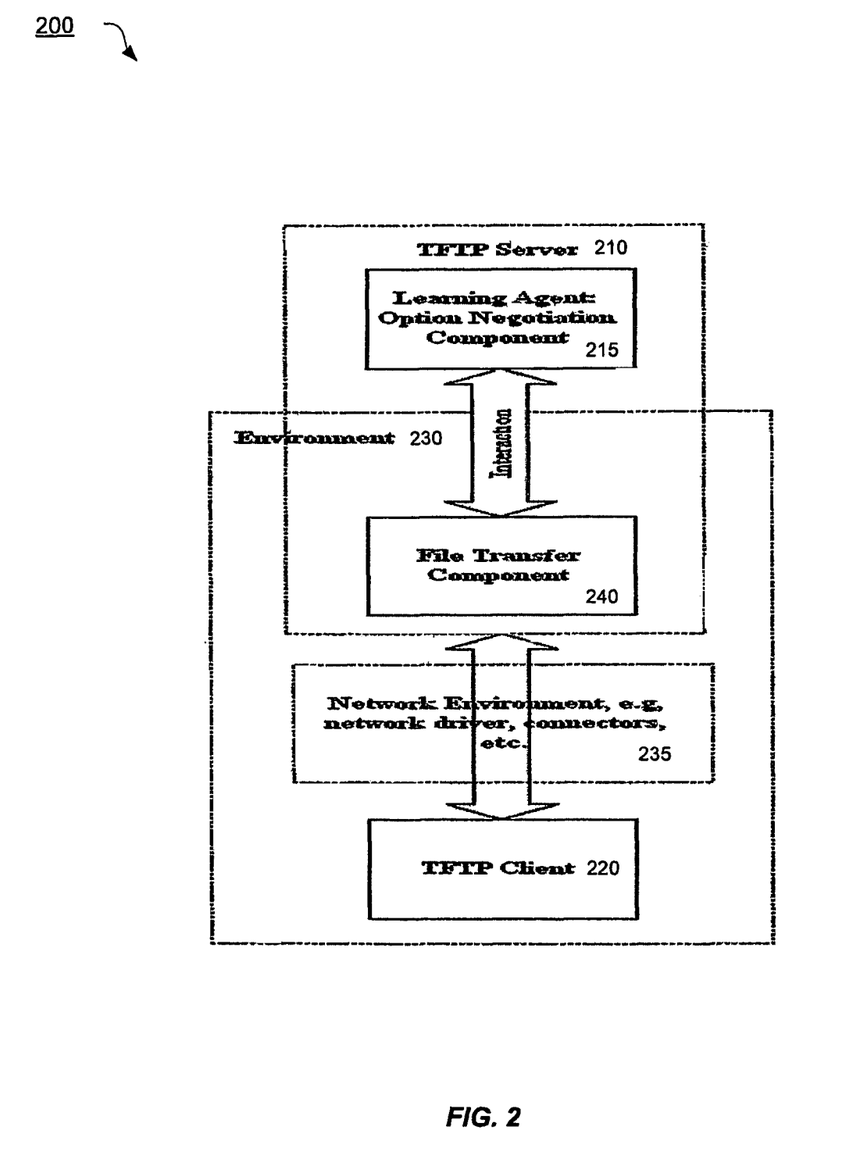
FIG. 2 is a block diagram of one embodiment of a network environment for providing optimal option selection for trivial file transfer protocol (TFTP)

FIG. 2 is a block diagram illustrating one embodiment of a system 200 for providing optimal option selection for TFTP. In one embodiment, a TFTP server 210 interacts with an environment 230 using a trial-and-error strategy by providing different options. In one embodiment, the environment 230 includes a file transfer component 240 of the TFTP server 210, along with a network environment 235 (switches, network drivers, etc.) and one or more TFTP clients 220. The option negotiation component 215 of TFTP server 210 is outside of and interacts with the environment 230.

In one embodiment, the TFTP server 210 receives performance feedback for the different options as rewards, and improves its decision-making policy for option negotiation based on these past experiences and resulting rewards. In some embodiments, the TFTP server 210 may optionally upload the decision-making policy along with the observed configurations of the specific environment to a centralized place (e.g., an electronic library). Other TFTP servers 210 may then download the resources and use the policy for the most similar environment to start their own trial-and-error learning process. In some embodiments, option negotiation via a decision-making process in uncertain environments is accomplished by applying a Q-learning method.

In one embodiment, an option negotiation component 215 of the TFTP server 210 may be utilized as an intelligent agent that interacts with the environment 230. The option negotiation component 215 provides the trial options for various environments 230 and receives the rewards as feedback. The option negotiation component 215 then utilized reinforcement learning to come to the optimal option selection for any particular environment 230.

In some embodiments, the option negotiation component 215 may be in a certain state $s_t$ at a time t. The state is used to describe the specific status of the current system, namely the pending file transfer requests and existing transfer sessions along with the options of the sessions. State transitions may occur whenever a new request is received, new sessions are created, or old sessions are ended.

At state $s_t$, the option negotiation component 215 may choose an action $a_t$ from the action set allowed in the state $D(s_t)$. For most of the states where there are no pending file transfer requests, only a null action is allowed. For the states where there are new file transfer requests, the action set includes all of the legal options the TFTP server 210 may respond with. At each time step t, a reward $r_t$ is received describing the utility that the option negotiation component 215 obtains. In some embodiments, a reward may refer to the data transferred at that time plus any penalties incurred, such as those caused by a timeout, session failure, etc.

In one embodiment, the state transitions are assumed to depend on the action probabilistically according to an unknown distribution $P(s_{t+1}|s_t, a_t)$ of the specific network environment. The rewards are assumed to depend on the state the agent resides and the action it takes probabilistically according to an unknown distribution $P(r_{t+1}|s_t, a_t, s_{t+1})$ of the specific network environment.

The goal of the option negotiation component 215 is to decide appropriate actions to maximize the performance of a file transfer, i.e., to choose appropriate actions to maximize the discounted returns during an infinite long run. This may be demonstrated as:

$$r^{(t)} = \lim_{T \to \infty} \sum_{r=0}^{T} \gamma^r r_{t+r}.$$

In one embodiment, in order to resolve the problem, a Q-function may be introduced that is the expected return of an action a at a state s with respect to a policy $\pi$ as:

$$Q^\pi(s, a) = E_\pi(R^{(t)} | S_t = s) = E_\pi\left(\sum_{r=t+1}^{\infty} \gamma^{r-t-1} R_r \,\middle|\, S_t = s, A_t = a\right),$$

The policy $\pi$ denotes the probability distribution of choosing actions at the various states. Capital letters, such as S, A, are used to denote the random variables, and lower case letters, such as s, a, are used to denote the value of the random variables.

The Q-function of the optimal policy $\pi^*$ satisfies the following Bellman optimal equation:

$$Q^*(s, a) = \sum_{s'} P_{ss'}^a \left[R_{ss'}^a + \gamma \max_{a'} Q^*(s', a')\right],$$

where, $$P_{ss'}^a = P(S_{t+1} = s' | S_t = s, A_t = a), \text{ and,}$$

$$R_{ss'}^a = E(R_{t+1} | S_t = s, A_t = a, S_{t+1} = s')$$
$$= \sum_{r_{t+1}} r_{t+1} P(R_{t+1} = r_{t+1} | S_t = s, A_t = a, S_{t+1} = s').$$

The Q-learning algorithm is a standard approach of reinforcement learning that iteratively calculates the value functions of the optimal policy. Under the Q-learning algorithm, let $\hat{Q} \cdot (s, a)$ denote the estimated Q function of the optimal policy. These values may then either be stored as a lookup table, or approximated by functions h(s, a, w) with w as parameters (e.g., a linear function of features implied in the states s and the actions a, or more sophisticated function approximators).

In one embodiment, the Q-learning algorithm works as follows:
1. Initialize $\hat{Q} \cdot (s, a)$.
2. t←0, k←1, start from $s_0$.
3. Select an action at according the distribution $$P(A_t = a_t | S_t = s_t) \propto k^{\hat{Q} \cdot (s_t, a_t)},$$

and transit to the state $s_{t+1}$, and receive the immediate reward $r_{t+1}$.
4. Update the estimated Q function with a sample backup strategy for the Bellman optimal equation $$\hat{Q}^*(s_t, a_t) \leftarrow \hat{Q}^*(s_t, a_t) + \alpha\left[r_{t+1} + \gamma \max_{a_{t+1}} \hat{Q}^*(s_{t+1}, a_{t+1}) - \hat{Q}^*(s_t, a_t)\right].$$

5. Increase k and t←t←1.
6. If the terminate condition is not met, go back to step 2.
7. Optionally retrieve the configurations of the environment and upload the policy (estimated Q function) to a centralized environment.

Figure 3:
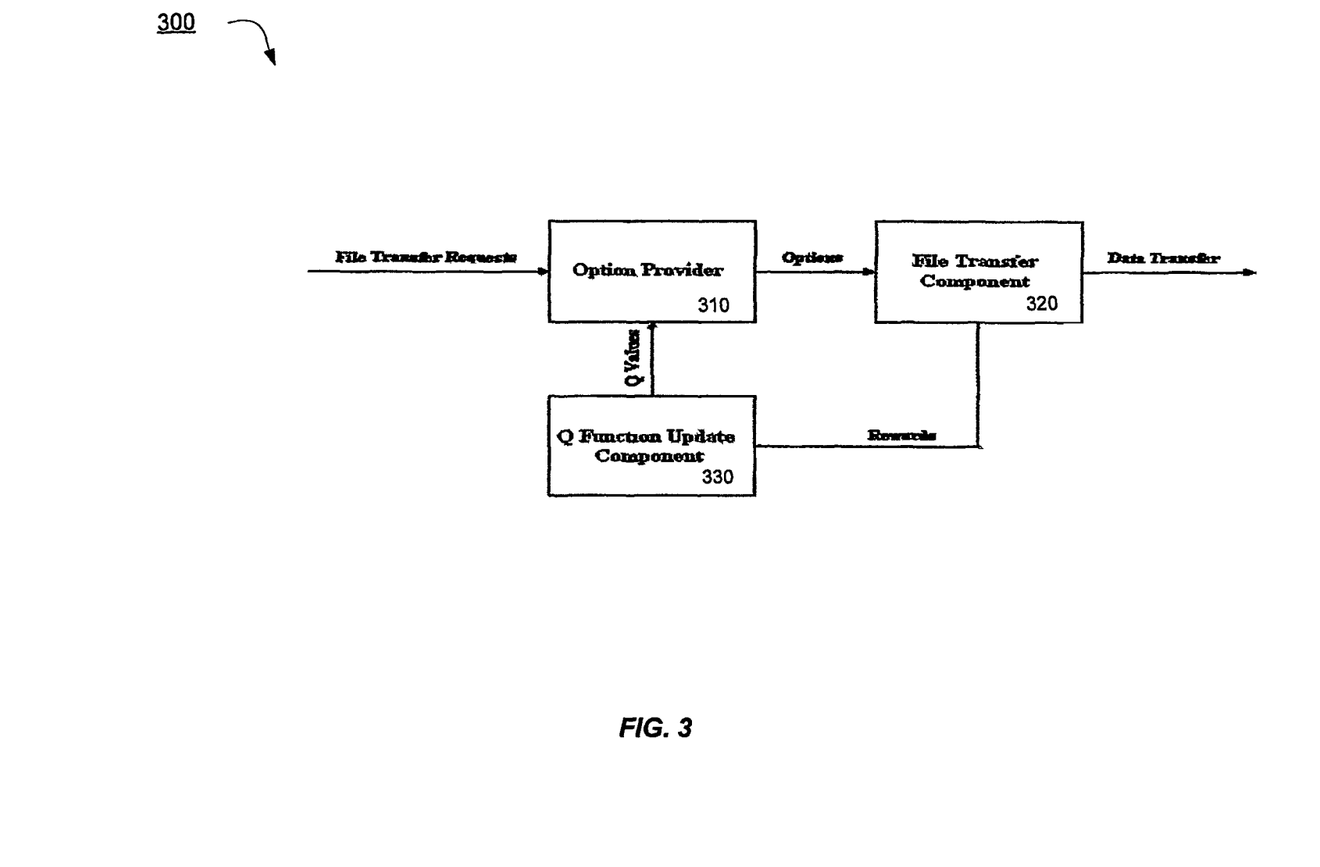
FIG. 3 is a block diagram of one embodiment of an application of option optimization using reinforcement learning.

FIG. 3 is a block diagram of one embodiment of the application of option optimization using reinforcement learning, such as the Q-learning algorithm, in a system 300. The components of system 300 interact together to utilize various embodiments of the invention. The components of system 300 include an option provider 310, a file transfer component 320, and a Q-function update component. In one embodiment, these components are included as part of TFTP server 210, described with respect to FIG. 2.

In one embodiment, option provider 310 receives file transfer requests. Option provider may associate the environment of the file transfer requests with, for example, Q values related to a Q-learning algorithm. Option provider 310 may then select options for the environment based on the Q values. These selected options, as well as the file transfer requests, are sent to the file transfer component 320.

File transfer component 320, in turn, transfers data associated with the file transfer requests. File transfer component 320 also sends feedback, or rewards, to Q function update component 330. Q function update component may modify its Q values that is provides to option provider 310 based on the rewards received from file transfer component 320.

In some embodiments, the components of system 300 utilize a Q-learning algorithm, such as that described above. In the initialization stage (e.g., step 1) of the above algorithm, the initial Q function values may be randomized if there is no further information available. However, if the server is able to download resources from the centralized environment, the server may select the policy of the most similar environment by comparing the observed configurations to initialize the Q function.

When the values of the estimated Q function are stored with a lookup table, the estimated Q function converges to the values of the optimal policy when the parameters are controlled in an appropriate manner. The action selected in step 2 of the algorithm, may be optimal when k gets larger after a certain number of iterations.

Figure 4:
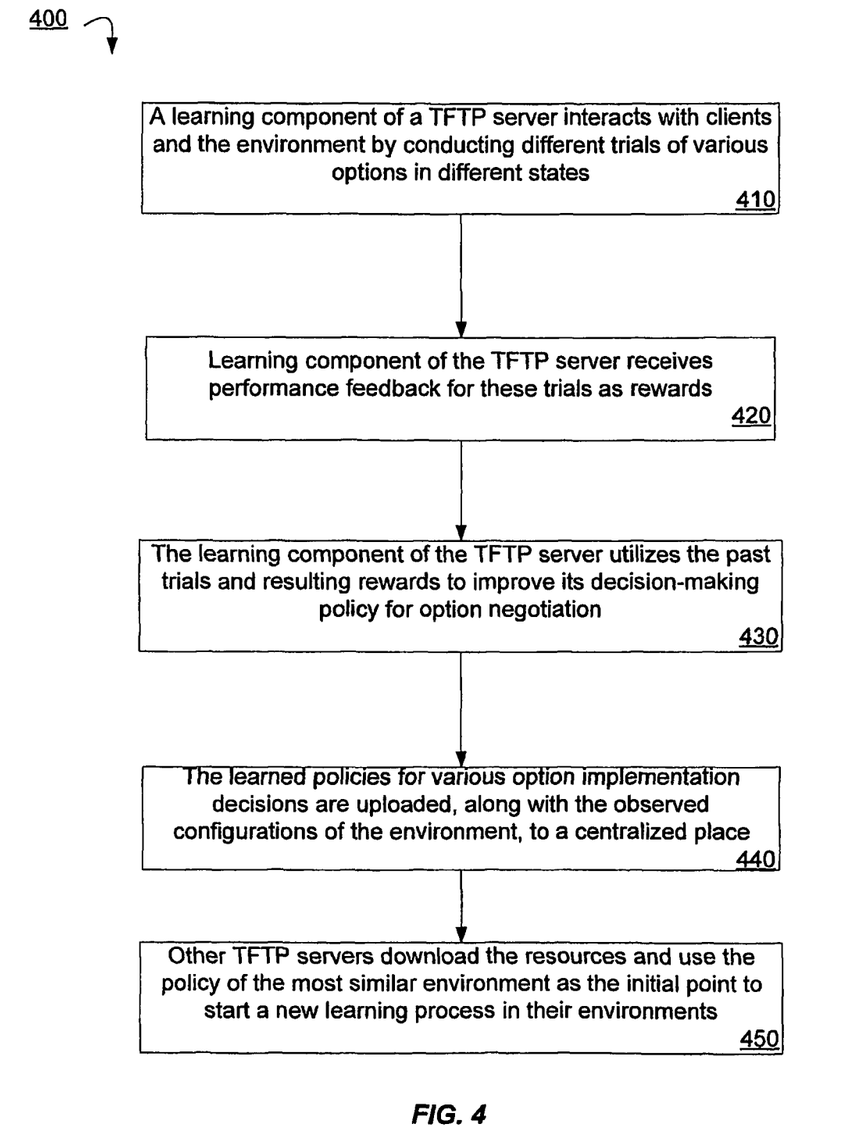
FIG. 4 is a flow diagram depicting a method of one embodiment of the invention.

FIG. 4 is a flow diagram illustrating a method of one embodiment of the invention. Process 400 provides a method for optimization of network protocol options with reinforcement learning and propagation. The process 400 begins at processing block 410 where a learning component of a TFTP server interacts with clients, as well as with the environment, by conducting different trials of various TFTP options in different states. Then, at processing block 420, the learning component of the TFTP server receives performance feedback for these trials as rewards.

At processing block 430, the learning component of the TFTP server utilizes the past trials and resulting rewards to improve its decision-making policy for option negotiation. In some embodiments, a reinforcement learning algorithm is used to improve the decision-making policy. In one embodiment, the reinforcement algorithm may be a Q-learning algorithm.

At processing block 440, the learned policies for various option implementation decisions are uploaded, along with the observed configurations of the environment, to a centralized place (e.g., an electronic library). Then, at processing block 450, other TFTP servers may then download the resources and use the policy of the most similar environment as the initial point to start a new learning process in their environments.

One skilled in the art will appreciate the embodiments of the present invention may be applied to communication protocols other than TFTP, and the present descriptions are not intended to limit the application of the various embodiments to solely TFTP.

Figure 5:
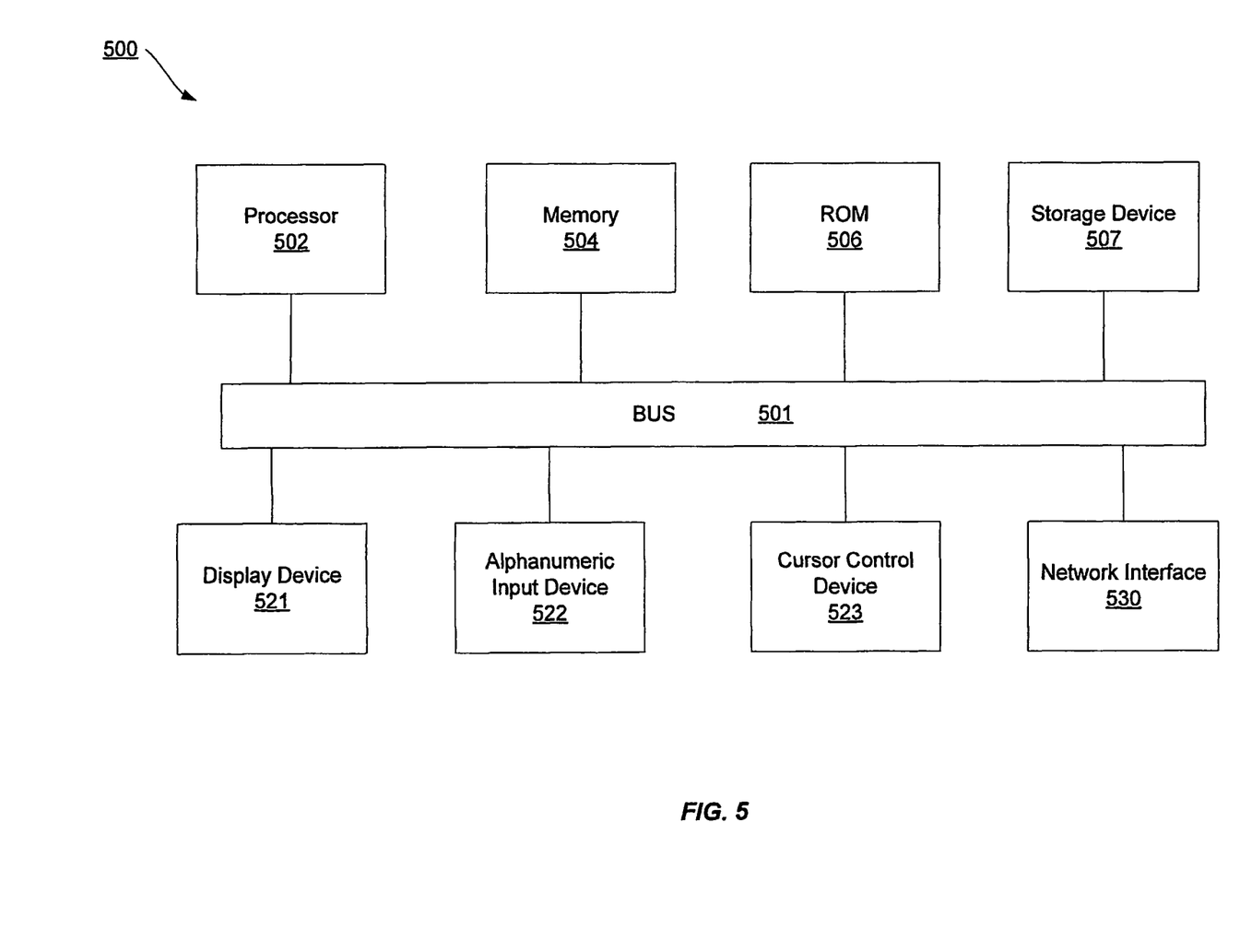
FIG. 5 illustrates a block diagram of one embodiment of an electronic system to perform various embodiments of the invention.

In some embodiments, components of the TFTP server or other clients may utilize various electronic systems to perform embodiments of the invention. The electronic system 500 illustrated in FIG. 5 is intended to represent a range of electronic systems, for example, computer systems, network access devices, etc. Alternative systems, whether electronic or non-electronic, can include more, fewer and/or different components.

Electronic system 500 includes bus 501 or other communication device to communicate information, and processor 502 coupled to bus 501 to process information. In one embodiment, one or more lines of bus 501 are optical fibers that carry optical signals between components of electronic system 500. One or more of the components of electronic system 500 having optical transmission and/or optical reception functionality can include an optical modulator and bias circuit as described in embodiments of the invention.

While electronic system 500 is illustrated with a single processor, electronic system 500 can include multiple processors and/or co-processors. Electronic system 500 further includes random access memory (RAM) or other dynamic storage device 504 (referred to as memory), coupled to bus 501 to store information and instructions to be executed by processor 502. Memory 504 also can be used to store temporary variables or other intermediate information during execution of instructions by processor 502.

Electronic system 500 also includes read only memory (ROM) and/or other static storage device 506 coupled to bus 501 to store static information and instructions for processor 502. Data storage device 507 is coupled to bus 501 to store information and instructions. Data storage device 507 such as a magnetic disk or optical disc and corresponding drive can be coupled to electronic system 500.

Electronic system 500 can also be coupled via bus 501 to display device 521, such as a cathode ray tube (CRT) or liquid crystal display (LCD), to display information to a computer user. Alphanumeric input device 522, including alphanumeric and other keys, is typically coupled to bus 501 to communicate information and command selections to processor 502. Another type of user input device is cursor control 523, such as a mouse, a trackball, or cursor direction keys to communicate direction information and command selections to processor 502 and to control cursor movement on display 521. Electronic system 500 further includes network interface 530 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 530) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Embodiments of the invention provide numerous advantages over prior art solutions, including: (1) dynamically deciding TFTP option to optimize the network performance according to the environment; (2) adaptive, self-learning approach for option optimization; and (3) information propagation of learned strategies in different environments for future reuse.

In addition, embodiments of the invention provide a self-learning, self-adapting, and self-distributing system seamlessly integrated into standard TFTP without impacting current protocol options and capabilities. One skilled in the art will appreciate that embodiments of the invention may potentially be applied to other network transportation protocols, such as file transfer protocol (FTP).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
conducting, by a learning component of a server of a network, different trials of one or more options in different states of a network communication between a client and the server via a protocol of the network communication, wherein each trial is defined by a combination of the one or more options occurring at a particular state of the network communication;
receiving, by the learning component, performance feedback for the different trials as rewards; and
utilizing, by the learning component, the different trials and their associated resulting rewards to improve a decision-making policy made by an option negotiation component of the server for negotiation of one or more options, wherein the one or more options defining specifications of the network communication between the server and the client, wherein the decision-making policy is used to choose one or more actions to maximize file transfer performance based on the one or more options as negotiated by the option negotiation component, wherein the option negotiation component to serve as an intelligent agent to interact with multiple environments and provide a trial option for each of the multiple environments and receive the rewards as the performance feedback.

2. The method of claim 1, further comprising uploading, based on the different trials and rewards, an optimum set of options associated with an observed configuration of the server, the client, and a network environment enabling the network communication between the server and the client to a centralized place.

3. The method of claim 2, wherein one or more other servers download from the centralized place the optimum set of options to utilize as an initial point to start a new learning process in the environment of the one or more other servers.

4. The method of claim 1, wherein the option negotiation component applies a reinforcement learning algorithm to improve the decision-making policy for negotiation of the one or more options.

5. The method of claim 4, wherein the reinforcement algorithm utilizes a Q-learning method, wherein the Q-learning algorithm iteratively calculates value functions of an optimal policy for option selection by the option negotiation component.

6. The method of claim 1, wherein the server is a trivial file transfer protocol (TFTP) server.

7. The method of claim 1, wherein the option negotiation component is placed in a particular state at a particular time, wherein the particular state is used to describe a plurality of status of a file transfer system, the plurality of status relating to file transfer requests and sessions, the option negotiation component to use the plurality of status to provide the one or more options.

8. An apparatus comprising:
an option negotiation component to select one or more options for a communication protocol, receive rewards as performance feedback associated with the selection of the one or more options, and adjust the selection of the one or more options based on the rewards; and
a file transfer component to transfer a file utilizing an optimum set of the one or more options selected by the option negotiation component based on the rewards and adjusted selections to improve a decision-making policy made by the option negotiation component for negotiation of the one or more options, wherein the decision-making policy is used to choose one or more actions to maximize performance of the transfer of the file based on the one or more options as negotiated by the option negotiation component, wherein the option negotiation component to serve as an intelligent agent to interact with multiple environments and provide a trial option for each of the multiple environments and receive the rewards as the performance feedback.

9. The apparatus of claim 8 wherein the option negotiation component applies a reinforcement learning algorithm that determines the one or more options to select, the performance feedback for the selection, and the adjustment of the selection.

10. The apparatus of claim 9, wherein the reinforcement algorithm utilizes a Q-learning algorithm, wherein the Q-learning algorithm iteratively calculates value functions of an optimal policy for option selection by the option negotiation component.

11. The apparatus of claim 8, wherein the option negotiation component and the file transfer component are components of a trivial file transfer protocol (TFTP) server.

12. The apparatus of claim 8, wherein the option selection component further to upload the optimum set of options and associated configurations of an environment associated with the optimum set of options to a centralized place.

13. The apparatus of claim 8, wherein the option negotiation component is placed in a particular state at a particular time, wherein the particular state is used to describe a plurality of status of a file transfer system, the plurality of status relating to file transfer requests and sessions, the option negotiation component to use the plurality of status to provide the one or more options.

14. A system comprising:
a network environment; and
a server communicatively coupled to the network environment via a network interface and including:
an option negotiation component to select one or more options for a communication protocol, receive rewards as performance feedback associated with the selection of the one or more options, and adjust the selection of the one or more options based on the rewards; and
a file transfer component to transfer a file utilizing an optimum set of the one or more options selected by the option negotiation component based on the rewards and adjusted selections to improve a decision-making policy made by the option negotiation component for negotiation of the one or more options, wherein the decision-making policy is used to choose one or more actions to maximize performance of the transfer of the file based on the one or more options as negotiated by the option negotiation component, wherein the option negotiation component to serve as an intelligent agent interact with multiple environments and provide a trial option for each of the multiple environments and receive the rewards as the performance feedback.

15. The system of claim 14, wherein the option negotiation component applies a reinforcement learning algorithm that determines the one or more options to select, the performance feedback for the selection, and the adjustment of the selection.

16. The system of claim 15, wherein the reinforcement algorithm utilizes a Q-learning algorithm, wherein the Q-learning algorithm iteratively calculates value functions of an optimal policy for option selection by the option negotiation component.

17. The system of claim 14, wherein the server is a trivial file transfer protocol (TFTP) server.

18. The system of claim 14, wherein the option negotiation component uploads an optimum set of options based on the different trials and rewards and observed configurations of the environment associated with the optimum set of options to a centralized place.

19. The system of claim 14, wherein the option negotiation component is placed in a particular state at a particular time, wherein the particular state is used to describe a plurality of status of a file transfer system, the plurality of status relating to file transfer requests and sessions, the option negotiation component to use the plurality of status to provide the one or more options.

* * * * *